United States Patent [19]

Graff

[11] 4,280,843

[45] Jul. 28, 1981

[54] FRIT GLASS COMPOSITION

[75] Inventor: William A. Graff, Willoughby, Ohio

[73] Assignee: General Electric Company, Schenectady, N.Y.

[21] Appl. No.: 148,917

[22] Filed: May 12, 1980

[51] Int. Cl.$^3$ .............................................. C03C 5/00
[52] U.S. Cl. ...................................... 106/48; 106/54
[58] Field of Search .................................. 106/54, 48

[56] References Cited

U.S. PATENT DOCUMENTS 3,005,722  10/1961  Cerulli .................................... 106/54
3,615,772  10/1971  Kohut ..................................... 106/54

Primary Examiner—Helen M. McCarthy
Attorney, Agent, or Firm—John F. McDevitt; Lawrence R. Kempton; Philip L. Schlamp

[57] ABSTRACT

A novel frit glass composition is disclosed which is particularly useful to color the soda-lime glass envelopes of incandescent lamps. Specifically, the present glass frit can be combined with various colored oxides to produce the colored coating when fired on the surface of the lamp glass envelope. The glass frit has a composition expressed in terms of weight percent, based on the starting batch formulation, as follows:

| | |
|---|---|
| $SiO_2$ | 18–25 |
| $TiO_2$ | 0–5 |
| $ZrO_2$ | 7–12 |
| $ZnO$ | 18–21 |
| $BaO$ | 4–6 |
| $CaO$ | 4–6 |
| $Na_2O$ | 2–4 |
| $K_2O$ | 6–8 |
| $B_2O_3$ | 15–22 |
| $Al_2O_3$ | 3–7 |
| F | 0–3 |

6 Claims, No Drawings

FRIT GLASS COMPOSITION

BACKGROUND OF THE INVENTION

This invention relates to particular zinc borosilicate glass compositions suitable for enamel coatings on soda-lime glass envelopes. More particularly, it relates to said glass compositions which are devoid of both lead and arsenic content in order to reduce any ecological hazards associated with these substances.

Lead and arsenic-free zinc borosilicate glass compositions are known and have been used as colored frits for bonding to both metal and ceramic substrates. For example, U.S. Pat. No. 3,005,722 discloses such a glass composition for use in ceramic type electroluminescent lamp devices wherein the uncolored frit serves as a binder of phosphor particles when fused to a porcelainized iron plate. Colored enamels using said type glass compositions are also disclosed in U.S. Pat. No. 3,527,649 which can employ various inorganic pigments such as cadmium, selenium, iron, copper, cobalt and other metal compounds to produce high colored glazes when fired on ceramic ware.

Other zinc borosilicate frit compositions generally containing lead and/or arsenic oxides have also been used as colored enamels for incandescent lamp envelopes. A typical known fit glass for adherence to the soda-lime glass bulb surface and which exhibits a high degree of weathering resistance has the following analysis in weight percent: $ZnO$—2.2, $SiO_2$—20.6, $B_2O_3$—14.8, $Al_2O_3$—2.2, $Na_2O$—1.8, $K_2O$—1.2, $CaO$—1.3, $TiO_2$—2.8, $ZrO_2$—6.2, F—0.3, PbO—44.4, CdO—2.2. Another known frit class exhibiting less weathering resistance but which has been found satisfactory for indoor use type lamps has a typical analysis in weight percent as follows: $ZnO$—28.3, $SiO_2$—19.5, $B_2O_3$—21.7, $Al_2O_3$—2.7, $Na_2O$—4.9, $K_2O$—6.1, $CaO$—4.3, BaO—3.7, $TiO_2$—4.5, F—2.7, $Sb_2O_3$—1.6. Both of said glass frit compositions exhibit a linear thermal coefficient of expansion in the 0°–300° C. temperature range of approximately $70$–$80 \times 10^{-7}/°$ C. in order to match the thermal expansion characteristics of the soda-lime glass envelope when bonded thereto at the elevated firing temperatures. The lead oxide content in the first of said frit glass compositions provides greater water insolubility, hence is responsible for the higher degree of durability or weathering resistance found.

Because of the recognized objections to having either lead oxide or arsenic oxide as a constituent in surface coatings, however, it would be desirable to provide a frit glass devoid of said substances but which can exhibit equivalent weathering durability. On the other hand, any removal of lead oxide from this type zinc borosilicate glass composition results in a zinc borate containing glass which has significant water-solubility that can lead to dulling of the enamel surface when exposed to outside weather conditions. Accordingly, some further adjustment of this type frit glass composition is required in order to produce a satisfactory weather-proof enamel that can be applied in the customary manner to a soda-lime glass envelope.

SUMMARY OF THE INVENTION

It has now been discovered, surprisingly, that a zinc borosilicate frit glass which is devoid of both lead and arsenic can be produced having sufficient weather durability for outside exposure. More particularly, a novel frit glass has been discovered utilizing particularly proportions and ratios of other incorporated metal oxides to provide adequate weather durability along with a thermal coefficient of expansion suitable for mixing with customary inorganic pigments and applying the colored enamel to the exterior surface of a soda-lime glass envelope, all in the customary manner.

Briefly stated, the present invention provides certain embodiments of glass consisting essentially of about in weight percent:

| | |
|---|---|
| $SiO_2$ | 18–25 |
| $TiO_2$ | 0–5 |
| $ZrO_2$ | 7–12 |
| $ZnO$ | 18–21 |
| $BaO$ | 4–6 |
| $CaO$ | 4–6 |
| $Na_2O$ | 2–4 |
| $K_2O$ | 6–8 |
| $B_2O_3$ | 15–22 |
| $Al_2O_3$ | 3–7 |
| F | 0–3 | except for incidental impurities and residual fluxes and refining agents. In the preferred embodiments, the weight ratio of CaO to BaO is approximately 1 and the aggregate $ZnO + B_2O_3 + SiO_2$ weight percent is in the approximate range 58–63%. In other preferred embodiments the $TiO_2$ plus $ZrO_2$ aggregate weight percent is in the approximate range 11–13. A preferred glass composition meeting the foregoing weight ratio requirements consists essentially of about, in weight percent:

| | |
|---|---|
| $SiO_2$ | 18–21 |
| $TiO_2$ | 2–5 |
| $ZrO_2$ | 8–10 |
| $ZnO$ | 18–21 |
| $BaO$ | 5–6 |
| $CaO$ | 5–6 |
| $Na_2O$ | 2–4 |
| $K_2O$ | 6–8 |
| $B_2O_3$ | 20–22 |
| $Al_2O_3$ | 4–6 |
| F | 2–3 | except for incidental impurities and residual fluxes and refining agents. When the present frit glass composition is mixed in powder form with a conventional amount of inorganic pigment and thereafter suspended in a liquid slurry, there is provided a suitable enamel composition for deposition and firing on the soda-lime glass envelope surface to produce a desired weather-proof coating.

DESCRIPTION OF THE PREFERRED EMBODIMENTS

As previously indicated, the presently improved frit glass composition is still primarily zinc borosilicate glass which further includes $ZrO_2$ and $Al_2O_3$ along with other critical oxides in rather limited proportions to provide both weather durability and a proper thermal expansion characteristic along with softening point suitable for firing on a soda-lime glass substrate. Preferred glasses according to the present invention are reported in Table I below. As is common in glass technology, glass compositions are reported in terms of oxides as calculated from the batch starting materials. Although there may be minor differences between the glass composition as calculated in the conventional manner from batch constituents and any actual glass composition obtained therefrom, both compositions will be essentially the same. There is only slight volatilization of the batch constituents in the present glass composition during melting such as by some loss of fluorine, boric oxide, and alkali metal oxides that is to be expected. Consequently, the present invention contemplates a frit glass composition having the same composition ranges above set forth as calculated in the conventional manner from the starting batch formulations.

|  | -continued |
|---|---|
| CaO | 4-6 |
| $Na_2O$ | 2-4 |
| $K_2O$ | 6-8 |
| $B_2O_3$ | 15-22 |
| $Al_2O_3$ | 3-7 |
| F | 0-3 |

|  | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| ZnO | 20% | 20% | 20% | 20% | 20% | 20% | 20% | 20% | 22% | 20% | 20% | 20% | 20% | 22% | 18% | 15% | 20% | 22% | 25% |
| $SiO_2$ | 21 | 19 | 19.4 | 19 | 18 | 19.4 | 23 | 19.4 | 19.4 | 17.5 | 21 | 19.4 | 19.4 | 19.4 | 19 | 17.5 | 19.5 | 18 | 17.5 |
| $B_2O_3$ | 22 | 22 | 20 | 22 | 22 | 20 | 22 | 20 | 22 | 20 | 22 | 22 | 20 | 22 | 22 | 25 | 20 | 20 | 15 |
| $Al_2O_3$ | 4 | 5 | 5 | 4 | 5 | 5 | 4 | 5 | 5 | 5 | 2 | 5 | 5 | 3 | 3 | 5 | 5 | 7 | 5 |
| $Na_2O$ | 3 | 3 | 3 | 3 | 3 | 3 | 3 | 3 | 2 | 5 | 3 | 2 | 7 | 5 | 3 | 5 | 2 | 6 | 5 |
| $K_2O$ | 7 | 7 | 7 | 7 | 7 | 8 | 7 | 7 | 8 | 5 | 7 | 8 | 3 | 5 | 7 | 5 | 8 | 4 | 5 |
| CaO | 5 | 5 | 5 | 6 | 5 | 4 | 5 | 4 | 4 | 5 | 6 | 4 | 4 | 4 | 7 | 5 | 5 | 4 | 5 |
| BaO | 5 | 5 | 5 | 6 | 5 | 4 | 5 | 4 | 4 | 5 | 5 | 3 | 4 | 4 | 7 | 5 | 4 | 4 | 5 |
| $TiO_2$ | 2 | 2 | 5 | 2 | — | 4 | 6 | 5 | 3 | 5 | 2 | 4 | 5 | 5 | 2 | 5 | 3 | 4 | 5 |
| $ZrO_2$ | 9 | 9 | 7.6 | 9 | 12 | 7.6 | 3 | 7.6 | 7.6 | 7.5 | 9 | 7.6 | 7.6 | 7.6 | 9 | 7.5 | 7.5 | 6 | 7.5 |
| F | 2 | 3 | 3 | 2 | 3 | 3 | 2 | 3 | 3 | 3 | 3 | 3 | 3 | 2 | 3 | 3 | 3 | 3 | 3 |
| $Sb_2O_3$ | — | — | — | — | — | 2 | — | 2 | — | 2 | — | 2 | 2 | 1 | — | 2 | 2 | 2 | 2 |
| $Li_2O$ | — | — | — | — | — | — | — | — | — | — | — | — | — | — | — | — | 1 | — | — |
| 10% Citric Acid Rating[1] | 1 | 1 | 1− | 1− | 1− | 2+ | 2 | 2 | 2− | 2− | 2− | 2− | 3+ | 3 | 3− | 3− | 3− | 4+ | 4 |
| Coeff. Exp. $\times 10^{-7}$/°C. | 74.7 | 76.8 |  | 78.5 |  |  |  | 78.4 |  | 81.4 |  |  |  | 74.7 |  | 77.5 |  |  | 82.0 |
| Soft. Pt. °C. | 625 |  |  | 612 |  |  |  |  |  |  |  |  |  |  |  |  |  |  |  |
| Gloss Rating[2] | 2 | 1 | 3 | 1 | 1 | 3 | 1 | 2 | 2 | 1 | 1 | 2 | 3 | 3 | 1 | 2 | 1 | 1 | 3 |
| Opacity Rating[3] | 1 | 1 | 1 | 1 | 3 | 1 | 3 | 3 | 1 | 3 | 2 | 2 | 2 | 1 | 2 | 2 | 2 | 3 | 3 |

FOOTNOTES:
[1]10% Citric Acid Rating - 1 most durable, 5 least durable, coating removed from bulb.
[2]Gloss Rating - 1 high gloss, 3 low gloss (matte)
[3]Opacity rating - 1 low opacity (little diffusion) 3 high opacity (high diffusion)

As can be noted from the foregoing table, only the glass compositions for examples 1, 2 and 4 reside in the preferred compositional range so as to exhibit the most desirable physical properties in the fired enamel condition. The reported citric acid test in said table is the conventional criteria for outside weather resistance whereas the remaining gloss and opacity ratings reported in said table represent visual comparisons of light reflection and light diffusion, respectively.

It will be apparent from the foregoing description, therefore, that a novel frit glass composition is provided for general purpose use with soda-lime glass objects. It will also be apparent that minor variations in said glass compositions other than those specifically disclosed are included within the present glass compositions. It is intended to limit the present invention, therefore, only by the scope of the following claims.

What I claim as new and desire to secure by Letters Patent of the United States is:

1. A frit glass composition devoid of both lead and arsenic lead consisting essentially of about, in weight percent,

| $SiO_2$ | 18-25 |
|---|---|
| $TiO_2$ | 0-5 |
| $ZrO_2$ | 7-12 |
| ZnO | 18-21 |
| BaO | 4-6 | except for incidental impurities and residual fluxes and refining agents.

2. A glass as in claim 1 consisting essentially of about, in weight percent:

| $SiO_2$ | 18-21 |
|---|---|
| $TiO_2$ | 2-5 |
| $ZrO_2$ | 8-10 |
| ZnO | 18-21 |
| BaO | 5-6 |
| CaO | 5-6 |
| $Na_2O$ | 2-4 |
| $K_2O$ | 6-8 |
| $B_2O_3$ | 20-22 |
| $Al_2O_3$ | 4-6 |
| F | 2-3 | except for incidental impurities and residual fluxes and refining agents.

3. A glass as in claim 1 wherein the weight ratio of CaO to BaO is approximately 1.

4. A glass as in claim 1 wherein the aggregate $ZrO+B_2O_3+SiO_2$ weight percent is in the approximate range 58-63.

5. A glass as in claim 1 wherein the aggregate $TiO_2+ZrO_2$ weight percent is in the approximate range 11-13.

6. A glass as in claim 1 wherein the linear coefficient of thermal expansion in the 0°-300° C. temperature range is approximately $70-80 \times 10^{-7}$/° C.

* * * * *